(12) United States Patent
Firmin

(10) Patent No.: US 6,564,499 B1
(45) Date of Patent: May 20, 2003

(54) FISHING LURE ATTACHMENT

(75) Inventor: Herman P. Firmin, Baton Rouge, LA (US)

(73) Assignee: Knight Manufacturing Co., Inc., Tyler, TX (US)

( * ) Notice: Subject to any disclaimer, the term of this patent is extended or adjusted under 35 U.S.C. 154(b) by 0 days.

(21) Appl. No.: 09/912,663

(22) Filed: Jul. 25, 2001

(51) Int. Cl.[7] .................. A01K 85/00; A01K 85/16; A01K 85/18
(52) U.S. Cl. ............. 43/42.26; 43/42; 43/42.02; 43/42.1; 43/42.24
(58) Field of Search ........................ 43/42.26

(56) References Cited

U.S. PATENT DOCUMENTS

| | | | | |
|---|---|---|---|---|
| 2,883,785 A | * | 4/1959 | Croft | 43/42.09 |
| 3,112,576 A | * | 12/1963 | Tay | 43/42.14 |
| 3,959,912 A | * | 6/1976 | Lee | 43/42.02 |
| 3,996,688 A | | 12/1976 | Hardwicke | 43/42.09 |
| D243,175 S | | 1/1977 | Carver | D22/27 |
| 4,689,914 A | * | 9/1987 | Quinlan | 43/42.22 |
| 5,201,859 A | * | 4/1993 | Rosek | 43/42.19 |
| 5,231,786 A | | 8/1993 | Hughes | 43/42.39 |
| 5,412,900 A | * | 5/1995 | Rosek | 43/42.19 |
| 5,491,927 A | | 2/1996 | Oritz | 43/42.28 |
| 5,524,379 A | | 6/1996 | Hood | 43/42.31 |
| 5,533,296 A | | 7/1996 | Jansen | 43/42.36 |
| 5,625,975 A | * | 5/1997 | Imes | 43/42.09 |
| 5,857,284 A | | 1/1999 | Gunderson | 43/42.13 |
| 6,393,757 B2 | * | 5/2002 | Bomann | 43/42.09 |

* cited by examiner

Primary Examiner—Michael J. Carone
Assistant Examiner—H. A. Blackner
(74) Attorney, Agent, or Firm—Charles M. Kaplan

(57) ABSTRACT

A removable, adjustable attachment for fishing lures slows down and adds fish attracting movements to the motion of the lures to which it is connected.

19 Claims, 4 Drawing Sheets

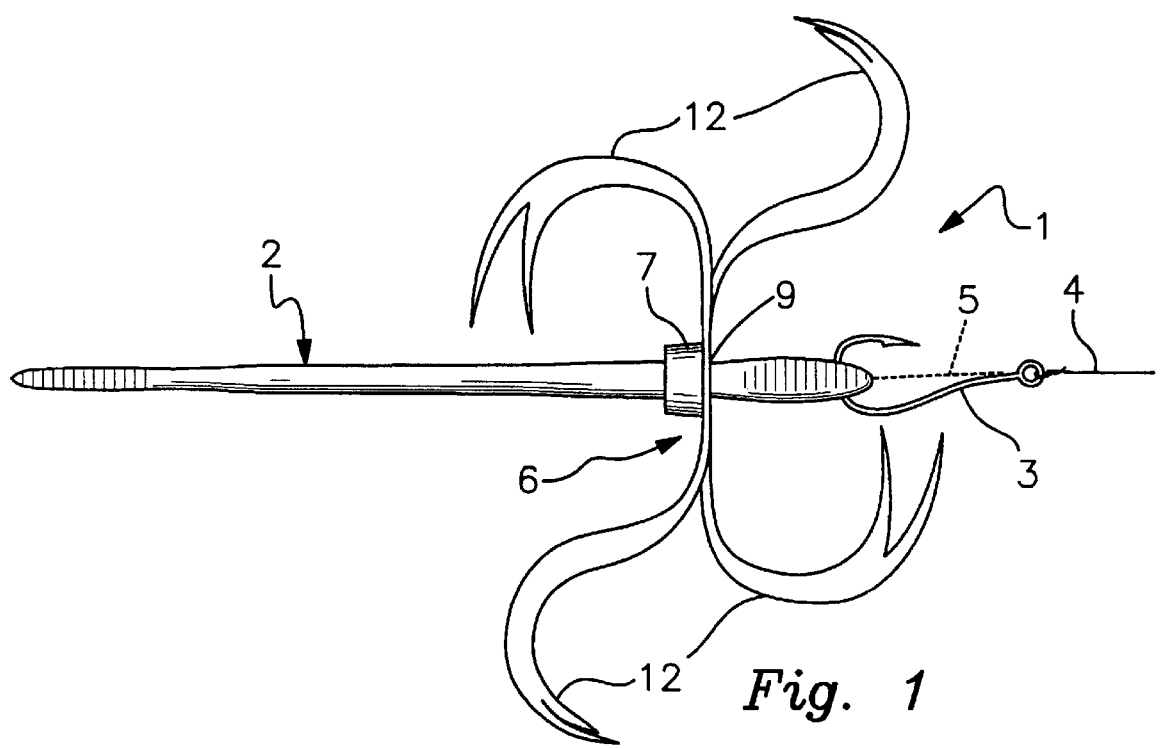
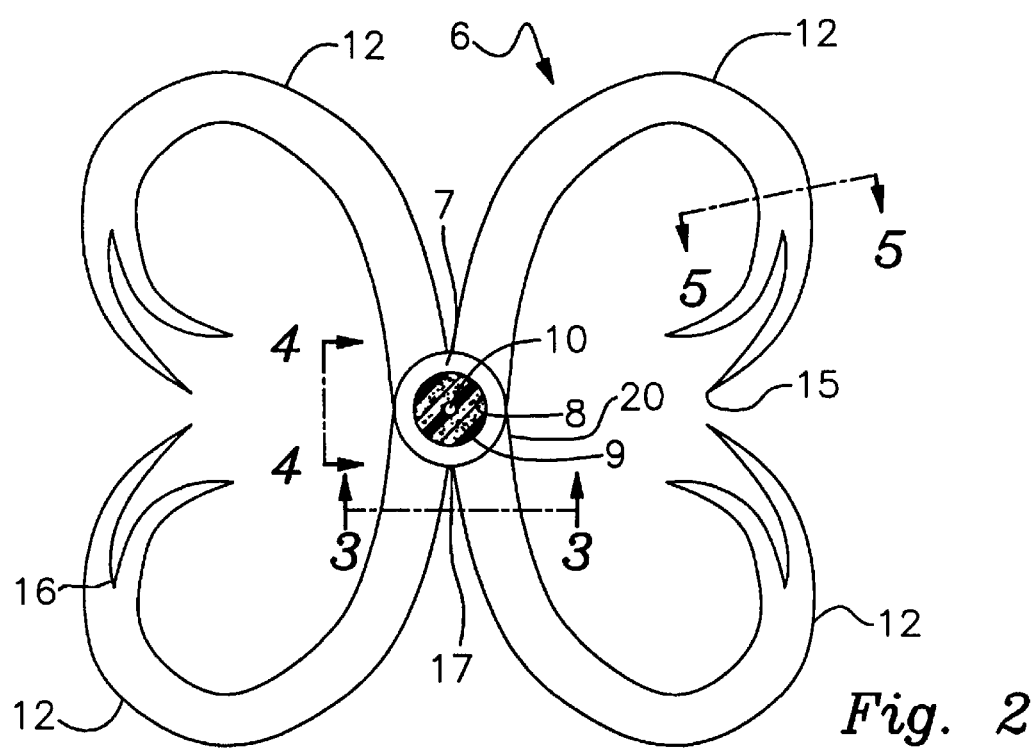

FISHING LURE ATTACHMENT

BACKGROUND OF THE INVENTION

This invention relates to fishing tackle and more particularly to artificial fishing lures. Soft bodied fishing lures feel relatively lifelike to game fish, so the striking fish will usually hold a soft lure longer in its mouth than the fish would hold a hard bodied lure. This allows the fisherman additional time to recognize the strike and set a hook in the fish's mouth. Some types of soft plastic fishing lures do not have any inherent wobbling motion or action that attracts game fish and causes them to strike. It is up to the fisherman using these lures to retrieve them in a way that causes an action that produces strikes. Many fishermen lack the skill and patience to consistently manipulate their tackle in ways that give these soft bodied lures a strike inducing action.

Other types of fishing lures such lead head jigs also do not have inherent fish attracting motions. Also, non-floating artificial lures may sink or otherwise move too fast to induce strikes under many fishing conditions.

OBJECTIVES OF THE INVENTION

Accordingly, it is an object of this invention to provide improved fishing tackle.

Another object is to provide soft appendages for fishing lures that feel lifelike.

An additional object is to provide jigs, soft bodied, and non-floating fishing lures with strike inducing action.

Another object is to provide attachments for live and artificial baits that impart fish attracting motions to such baits.

A further object is to provide adjustable attachments for fishing lures that can change the action of the lures when fishing conditions change.

An additional object is to provide removable attachments for fishing lures that can help relatively unskilled fishermen catch more fish.

Another object is to provide fishing baits with expanded surfaces that slow down the baits.

A further object is to provide removable fishing bait attachments that reflect and disperse light and sound waves in many directions.

Another object is to provide fishing lures with attachments that impart rotational components to the movements of the lures.

A further object is to provide fishing lures and attachments for fishing lures that are rugged, economical, highly attractive, easy to use and change and adjust, and which do not possess defects found in similar prior art fishing tackle.

Other objects and advantages of the fishing tackle incorporating this invention will be found in the specification and claims and the scope of the invention will be set forth in the claims.

DESCRIPTION OF THE DRAWING

FIG. 1 is a perspective view of an embodiment of a fishing bait in accord with this invention.

FIG. 2 is partially cross sectional plan view of the bait shown in FIG. 1

DESCRIPTION OF THE INVENTION

Figure 3:
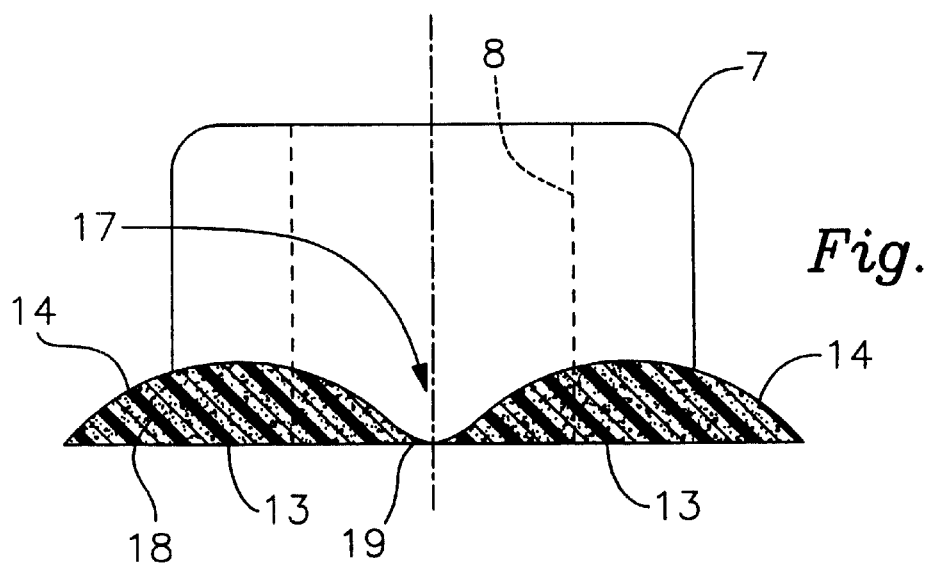
FIG. 3 is an enlarged cross section taken along the line 3—3 in FIG. 2.

The drawing shows a fishing tackle in accord with this invention. In the embodiment of FIGS. 1–5 a fishing lure 1 includes an artificial soft bodied plastic bait or worm 2 that has been impailed on a hook 3 that is attached to a fishing line 4 in conventional manner. The lure 1 may be retrieved by reeling in or pulling on the line 4 in the general direction of the longitudinal axis 5 that runs through the center of the lure.

To impart fish attracting and strike inducing motions to the lure 1, an integral one-piece attachment 6 has been placed on the bait 2. The attachment 6 should be made from a soft plastic. The attachment 6 has a relatively thick cylindrical central hub 7 with a circular center hole 8. The predetermined diameter of the hole 8 is less than the diameter of the of the portion 9 of the bait 2 where the attachment is located. The hub 7 has been stretched so that the bait 2 could be passed through the hole 8 and the resiliency of the hub allowed to grip the portion 9 with a friction fit tight enough to hold the attachment 6 in place. But the location of the attachment 6 along the worm 2 can be changed and the position of attachment 6 can be rotated or otherwise adjusted simply by moving or sliding the attachment 6 and bait relative to each other. The longitudinal central axis 5 of the bait 2 and the longitudinal central axis 10 of the hub 7 will be essentially coincident in the area where the attachment 6 is placed on the body of the bait 2.

The attachment 6 imparts motion to the lure 1 by means of a plurality of spaced, relatively thin, elongated rotors 12 that are integral with the hub 7. When viewed in cross section, the rotors 12 are essentially flat on one side 13 for their entire length, and when viewed in cross section the other or opposite side 14 of the rotors is arcuate or curved. The curvature of the side 14 need not be uniform throughout the length of any rotor 12, and different rotors may have different degrees of curvature. Also the width W and thickness T of the rotors 12 may vary along their length. Preferably both the thickness and width diminish approaching the tips 15 of the rotors, which may be split at 16.

The rotors 12 all lie in the same plane at their point or area 17 of attachment to the hub 7, and that plane is perpendicular to the longitudinal central axis 10. Thus the rotors 12 will be perpendicular to the longitudinal central axis in the area immediately adjacent to their points of attachment to the hub 7. Because of their flexibility, resilience and relative thin elongated shape, the portions of the rotors 12 spaced away from the hub 7 will gyrate and oscillate when the lure 1 is moved in water, and portions of the rotors 12, such as at their tips 15, will have essentially universal movement. When the attachment 6 is made from transparent or translucent plastic, tiny reflective particles or speckles 18 may be incorporated into the plastic and dispersed throughout the rotors 12.

Figure 4:
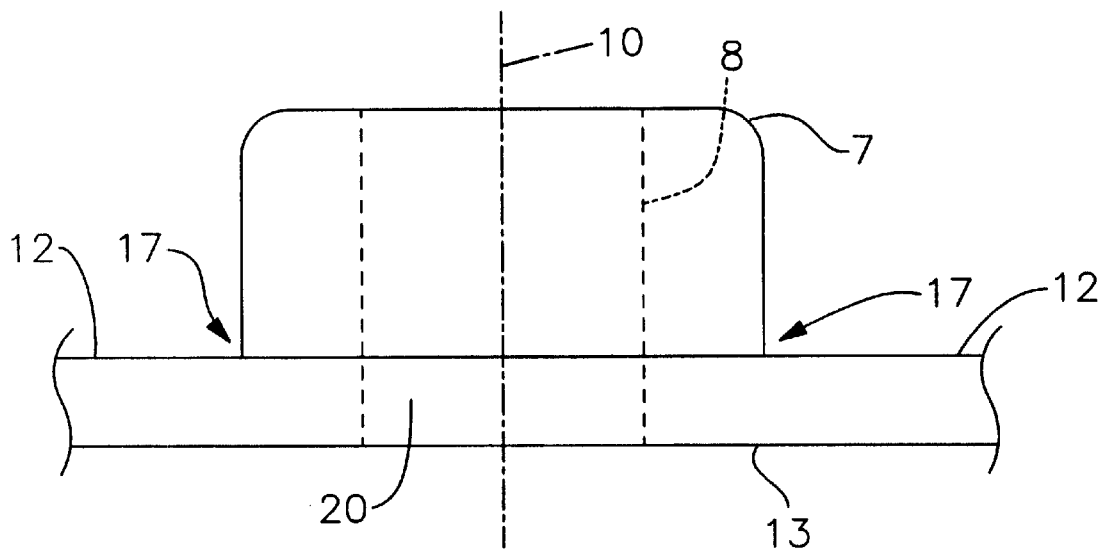
FIG. 4 is an enlarged cross section taken along the line 4—4 in FIG. 2
Figure 5:
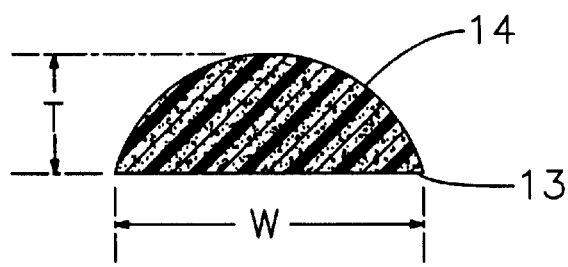
FIG. 5 is an enlarged cross section taken along the line 5—5 in FIG. 2

Rotors 12 are integral with hub 7 at one of its ends 19. The rotors 12 may be grouped into adjacent pairs that merge together at their points of attachment 17 with the hub 7, as shown in FIG. 3. As shown in FIG. 4, the attachment areas 17 on opposite sides of the hub 7 may be connected by a straight ledge 20 that runs around the hub 7. The ledge 20 connects and adds stiffness to the rotors 12 in the area 17 of their attachment to the hub 7.

FIGS. 6–10 show another embodiment of the invention in which a fishing lure 21 includes an artificial soft bodied plastic tubular bait 22 that has been impailed on a hook 3 that is attached to a fishing line 4 in conventional manner. The lure 21 may be retrieved by reeling in or pulling on the line 4 in the general direction of the longitudinal axis 23 that runs through the center of the lure.

An integral attachment 25 made from soft plastic has been placed on the bait 22. The attachment 25 has a relatively thick cylindrical central hub 26 with a circular center hole 27. The predetermined diameter of the hole 27 is less than the diameter of the of the portion 28 of the bait 22 in the area where the attachment is located. The hub 26 grips the portion 28 with a friction fit tight enough to hold the attachment 25 in place, and the location and rotational position of the attachment 25 can be changed or otherwise adjusted in the manner described above for the embodiment illustrated in FIGS. 1–5. The longitudinal central axis 23 of the tubular bait 22 and the longitudinal central axis 29 of the hub 26 will be essentially coincident in the area where the attachment 25 is placed on the body of the bait 21.

The attachment 25 also imparts motion to its lure by means of a plurality of spaced, relatively thin, elongated rotors 30 that are integral with its hub 26. When viewed in cross section, the rotors 30 are essentially flat on one side 31 for their entire length, and when viewed in cross section the other or opposite side 32 of the rotors is arcuate or curved. The curvature of the side 32 need not be uniform throughout the length of any rotor 30, and different rotors may have different degrees of curvature. Also the width W and thickness T of the rotors 30 may vary along their length. Preferably both the thickness and width diminish approaching the tips 33 of the rotors.

The rotors 30 all lie in the same plane at their point or area of attachment 34 to the hub 26, and that plane is perpendicular to the longitudinal central axis 29. Thus the rotors 30 will be perpendicular to the longitudinal central axis in the area immediately adjacent to their points of attachment to the hub 26. The rotors 30 may be attached to the hub at its center and may be uniformly spaced around the circumference of the hub. Because of their flexibility, resilience and relative thin elongated shape, the portions of the rotors 30 spaced away from the hub 26 will gyrate and oscillate when the lure 21 is moved in water, and portions of the rotors 30, such as at their tips 33, will have essentially universal movement. The rotors 30 may include tiny reflective particles or speckles 35 as previously described, and the tips may be split at 36.

The integral fishing lure attachments 6 and 25 may be injection molded from soft, pliable, resilient, life-like feeling plastics, such as plastisol formulations using polyvinyl chloride plasticized with esters of phathalate. Hubs 7 and 26 made from these plastics can stretch to receive, and then grip to hold, the portions of the lures to which they are attached. The fisherman can adjust and change to effect of the attachments 6 and 25 on his lures by sliding or rotating the attachments along the lures. Either the flat sides 13 and 31 or the round sides 14 and 32 of the rotors may face in the direction in which the lures are retrieved. The rotors for most of their length may move back and forth in essentially all directions as the lures are retrieved, and the rotors will slow the speed at which lures may be retrieved or fall in water. The pliability of the rotors 12 and 30 will enable strong forces to bend the rotors out of their perpendicular planes, but the inherent memory and resilience of the plastic will urge the rotors back toward or to their perpendicular planes in their areas 17 and 34 of attachment to the hubs.

Figure 6:
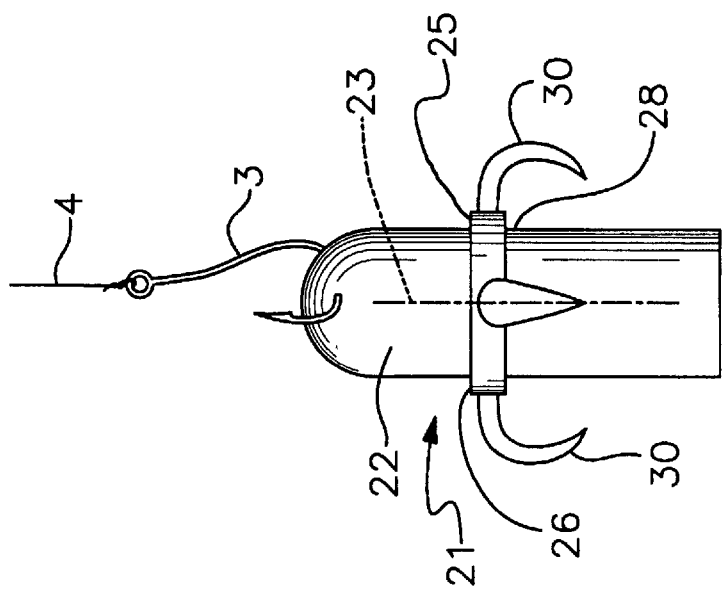
FIG. 6 a side view of another embodiment of a fishing bait in accord with this invention.
Figure 7:
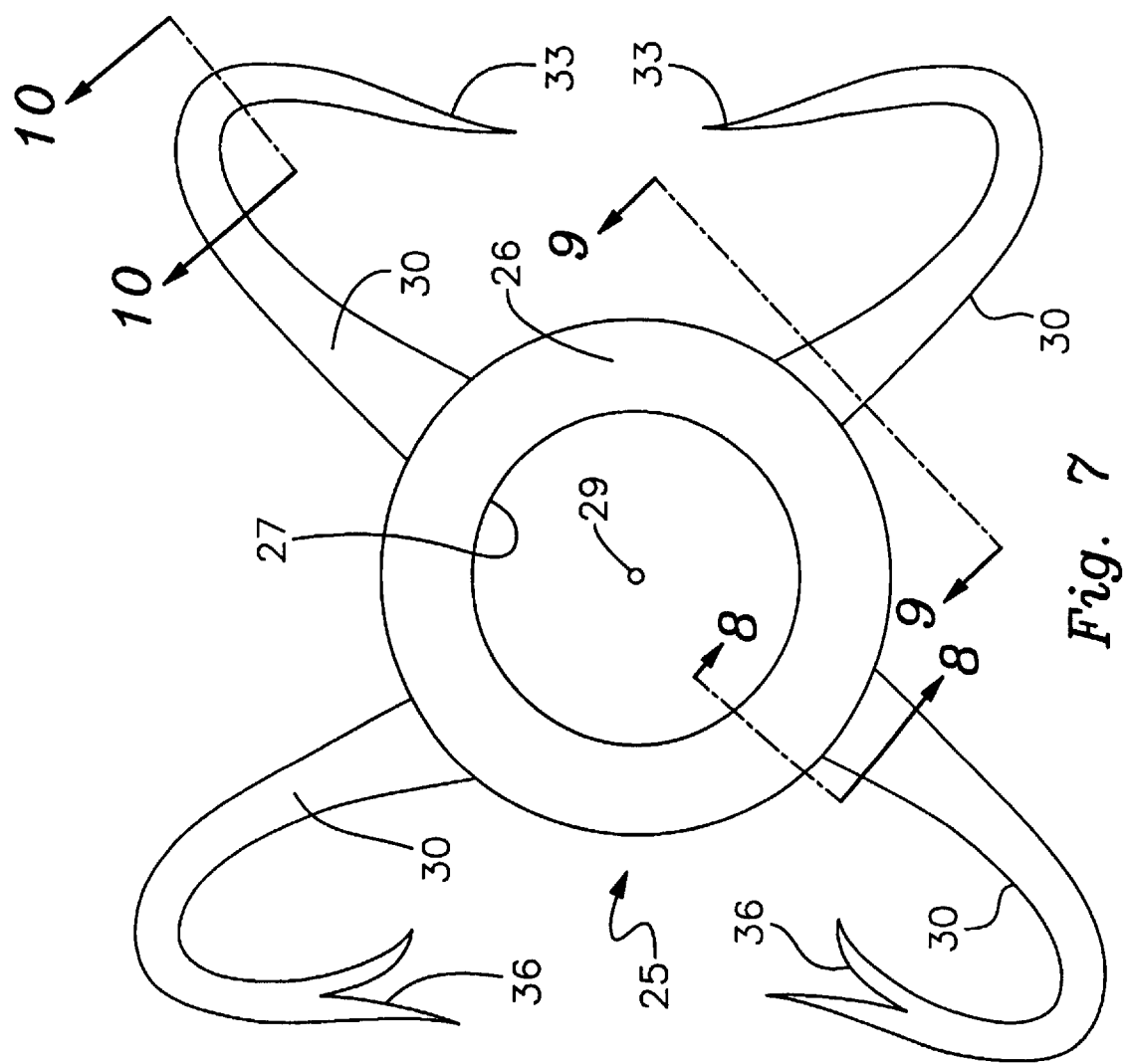
FIG. 7 is an enlarged top plan view of the attachment shown in FIG. 6.
Figure 8:
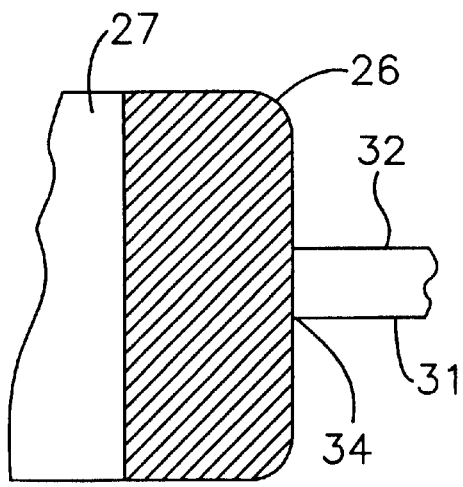
FIG. 8 is an enlarged cross section taken along the line 8—8 in FIG. 7.
Figure 9:
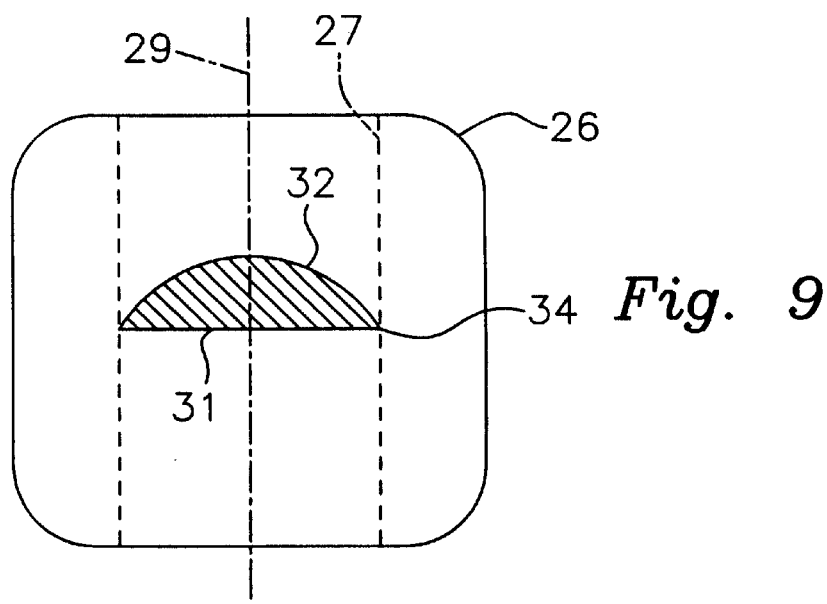
FIG. 9 is an-enlarged cross section taken along the line 9—9 in FIG. 7.
Figure 10:
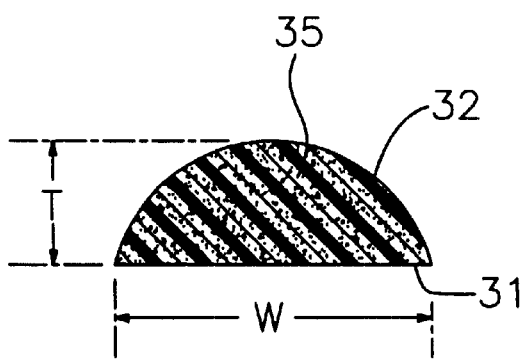
FIG. 10 is an enlarged cross section taken along the line 10—10 in FIG. 7.

When suspended vertically in air, as shown in FIG. 6, the rotors 12 and 30 will extend essentially perpendicularly to the central axis of their respective hubs 7 and 26 at the areas of attachment of the rotors to the hubs. When the fishing lures 1 and 21 are drawn through water or allowed to sink or otherwise move in water, the portions of these curved rotors 12 and 30 that act in the planes that are essentially perpendicular to the longitudinal central axes of the lures will impart rotational torques to the lures. These torques can cause the lures to turn, twist, oscillate or move in various unpredictable ways with respect to the lure longitudinal central axis. These unpredictable lure movements occur without requiring any special tackle manipulating skills from the fisherman.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A soft plastic attachment for a fishing bait, said fishing bait having a longitudinal central axis and a portion with a predetermined diameter, said attachment comprising: a relatively thick central hub having a longitudinal center axis that is coincident with said longitudinal central axis of said fishing bait said hub having a circular center hole of predetermined diameter therethrough, said diameter of said center hole being smaller than said diameter of said portion of said fishing bait, thereby to enable said attachment to be heldby a friction fiton said portion of said fishing bait by stretching said hub and passing said portion of said fishing bait through said center hole, the position of said attachment being changeable on said longitudinal central axis of said fishing bait a plurality of spaced, relatively thin, elongated, rotors integral with said hub, said rotors extending radially outwardly from said hub, said rotors extending essentially perpendicularly to said longitudinal central axis of said hub at their point of attachment to said hub, said rotors when viewed in cross section being curved on one side, and a portion of said rotors being essentially universally movable.

2. A soft plastic attachment for a fishing bait, said fishing bait having a longitudinal central axis and a portion with a predetermined diameter, said attachment comprising: a relatively thick central hub having a longitudinal center axis that is coincident with said longitudinal central axis of said fishing bait said hub having a circular center hole of predetermined diameter therethrough, said diameter of said center hole being smaller than said diameter of said portion of said fishing bait, thereby to enable said attachment to be heldby a friction fiton said portion of said fishing bait by stretching said hub and passing said portion of said fishing bait through said center hole, the position of said attachment being changeable on said longitudinal central axis of said fishing bait a plurality of spaced, relatively thin, elongated, rotors integral with said hub, said rotors extending radially outwardly from said hub, said rotors extending essentially perpendicularly to said longitudinal central axis of said hub at their point of attachment to said hub, said rotors when viewed in cross section being for their entire length flat on one side and curved on their opposite side and a portion of said rotors being essentially universally movable.

3. The plastic attachment for a fishing bait defined in claim 1, wherein said rotors are integral with said hub adjacent its center.

4. The plastic attachment for a fishing bait defined in claim 1, wherein said rotors are are integral with said hub adjacent one of its ends.

5. A fishing lure having a longitudinal central axis, said fishing lure being movable along said longitudinal central axis, a plurality of soft, plastic, relatively thin, elongated rotors extending radially outwardly from said fishing lure, said rotors extending essentially perpendicularly to said longitudinal central axis at their point of attachment to said fishing lure, said rotors when viewed in cross section being for their entire length flat on one side and curved on their opposite side, and a portion of said rotors being essentially universally movable.

6. The fishing lure defined in claim 5, wherein said rotors at their point of attachment to said fishing lure all lie in a common plane that is essentially perpendicular to said longitudinal central axis.

7. The fishing lure defined in claim 5 wherein said rotors are removable from said fishing lure.

8. A fishing lure having a longitudinal central axis, said fishing lure being movable along said longitudinal central axis, a plurality of soft, plastic, relatively thin, elongated rotors extending radially outwardly from said fishing lure, said rotors extending essentially perpendicularly to said longitudinal central axis at their point of attachment to said fishing lure, said rotors when viewed in cross section being flat on one side and curved on their opposite side, a portion of said rotors being essentially universally movable, said rotors being removable from said fishing lure, said rotors being integral with a cylindrical central hub and extending radially outwardly from said hub, there being a center hole through said hub, a portion of said fishing lure including said longitudinal central axis extending through said center hole in said hub, said hub being held on said fishing lure by friction, and the position of said hub on said fishing lure being changeable.

9. The fishing lure defined in claim 8 wherein said hub has a central axis that is essentially coincident with said longitudinal central axis of said fishing lure.

10. A soft, plastic attachment for a fishing bait, said fishing bait having a longitudinal central axis and portion with a predetermined diameter, said attachment comprising: a relatively thick central hub having a longitudinal center axis that is coincident with said longitudinal central axis of said fishing bait said hub having a circular center hole of predetermined diameter therethrough, said diameter of said center hole being smaller than said diameter of said portion of said fishing bait, thereby to enable said attachment to be held by a friction fit on said portion of said fishing bait by stretching said hub and passing said portion of said fishing bait through said center hole, the position of said attachment being changeable on said longitudinal central axis of said fishing bait, a plurality of spaced, relatively thin, elongated, rotors integral with said hub, said rotors extending radially outwardly from said hub, said rotors when viewed in cross section being for their entire length curved on one side and flat on their opposite side, and a portion of said rotors being essentially universally movable.

11. The plastic attachment for a fishing bait defined in claim 10, wherein said rotors extend essentially perpendicularly to said longitudinal center axis at their point of attachment to said hub.

12. The plastic attachment for a fishing bait defined in claim 10, wherein said rotors are integral with said hub adjacent its center.

13. The plastic attachment for a fishing bait defined in claim 10, wherein said rotors are integral with said hub adjacent one of its ends.

14. An integral, soft, pliable, resilient, plastic attachment for a fishing lure, said attachment comprising: a relatively thick cylindrical central hub having a longitudinal center axis, said hub having a circular center hole therethrough that is adapted to receive and connect to a portion of said fishing lure, a plurality of spaced, relatively thin, elongated, rotors integral with said hub, said rotors extending radially outwardly from said hub, said rotors when viewed in cross section being curved on one side and flat on their opposite side, said rotors extending essentially perpendicularly to said longitudinal central axis in a common plane at their point of attachment to said hub, and a portion of said rotors being essentially universally movable.

15. The plastic attachment for a fishing lure defined in claim 14, wherein said rotors are spaced uniformly around said hub.

16. The plastic attachment for a fishing lure defined in claim 14, wherein adjacent pairs of rotors merge with each other on opposite sides of said hub at their points of attachment to said hub.

17. The plastic attachment for a fishing lure defined in claim 14, wherein said rotors are integral with said hub adjacent its center.

18. The plastic attachment for a fishing lure defined in claim 16, Wherein said rotors are integral with said hub adjacent one of its ends.

19. The plastic attachment for a fishing lure defined in claim 18, wherein a ledge connects and adds stiffness to said rotors at their points of attachment to said hub.

\* \* \* \* \*